United States Patent
Buckley et al.

(10) Patent No.: US 7,167,142 B2
(45) Date of Patent: Jan. 23, 2007

(54) MULTI-USER DISPLAY SYSTEM

(75) Inventors: Paul K Buckley, Ipswich (GB); Jonathan A Duhig, Wivenhoe (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 10/508,124

(22) PCT Filed: Mar. 19, 2003

(86) PCT No.: PCT/GB03/01169

§ 371 (c)(1),
(2), (4) Date: Sep. 16, 2004

(87) PCT Pub. No.: WO03/083717

PCT Pub. Date: Oct. 9, 2003

(65) Prior Publication Data

US 2005/0144259 A1  Jun. 30, 2005

(30) Foreign Application Priority Data

Mar. 27, 2002 (EP) .................................. 02252232

(51) Int. Cl.
*G06T 11/00* (2006.01)

(52) U.S. Cl. ..................................................... 345/2.1
(58) Field of Classification Search ................ 345/419, 345/2.1, 2.3
See application file for complete search history.

(56) References Cited

U.S. PATENT DOCUMENTS

| 6,077,162 A | 6/2000 | Weiss |
| 6,151,020 A | 11/2000 | Palmer et al. |
| 6,947,995 B1 * | 9/2005 | Chang et al. ............... 709/231 |

OTHER PUBLICATIONS

PCT International Search Report.

* cited by examiner

*Primary Examiner*—Almis R. Jankus
(74) *Attorney, Agent, or Firm*—Nixon & Vanderhye P.C.

(57) ABSTRACT

A multi user display system having a plurality of individual user terminals and a communal display screen has a server which recovers respective pages for display on the user terminals. The server is also responsive to a command from the user terminals which, when receives, causes the current display on the requesting terminal to be output to the communal display. The server is also responsive to a further command from the user terminals which, when received, causes the current display on the communal browser to become the current display on the requesting terminal.

34 Claims, 9 Drawing Sheets

MULTI-USER DISPLAY SYSTEM

This application is the US national phase of international application PCT/GB03/01169 filed 19 Mar. 2003 which designated the U.S. and claims benefit of EP 02252232.0, dated 27 Mar. 2002, the entire content of which is hereby incorporated by reference.

BACKGROUND

1. Technical Field

The present invention relates to a display system and more particularly, but not exclusively, to such a system for use in a multi person environment.

2. Related Art

In searching for information it is often difficult to share tasks between a group because there is no interchange of current, potentially interesting information being viewed by each member of the group. One way of overcoming this problem is for a group member finding something of interest on an intranet or internet page to send a message to each of the other members of the group including the URL which uniquely identifies the page currently in view. Such a system is inefficient, can lead to mistakes in the transmission of the URL and may waste time if the information does not contribute to the work of all of the other group members.

U.S. Pat. No. 6,151,020 discloses one system for use by a group when task sharing. This system transmits a common display to all of the users in the group at the same time. Periodic updates of the display occur to reflect changes introduced to the shared graphical area by one or more of the users so that all users see the same picture on their personal display screen area.

BRIEF SUMMARY

According to an exemplary embodiment of the present invention there is provided a display system including at least two independent search stations and a proxy server for connection to a data network, the proxy server including means responsive to input from each of the workstations to recover requested data and to transmit said data to the requested workstation, the proxy server further including means responsive to a first kind of input instruction from one of the workstations to cause the current display on that workstation to be replicated for communal display and means responsive to a second kind of input from one of the workstations to cause the current communal display to be replicated on that workstation.

Preferably the communal display is a communal display screen and each of the workstations comprises a personal display screen and input means. The workstation may be a personal digital assistant including known internet browser software, the software being adapted to communicate by way of the proxy server. The proxy server recovers requested information from the connected data network for each connected workstation and adapts the respective displays for each workstation to include "push" and "pull" icons which may be user selected using cursor or pointer selection as appropriate to the PDA.

Alternatively, where browser pads or terminals having larger display screens are in use the proxy server may be adapted to incorporate the communal display in a portion of each display screen for potential selection by the other users.

The communal display screen may incorporate several areas each capable of displaying a communal image so that a plurality of images pushed by the users may be presented.

Conflict between arriving push requests may be resolved within the proxy server by allowing a first image to be displayed for a predetermined minimum period followed by a further image selected by a different user.

Images selected by users may be cyclically displayed until each is cancelled by the originating requester or the originating requester selects a new image for display. The number of images in the cycle may be time or number limited with the least accessed or oldest image being removed from the cycle. Where access count is used to determine images for removal from the cycle, a predetermined minimum period during which the image is not removed may be appointed. Once such a predetermined period has expired then an access/time leaky bucket counter may be used and the image having the lowest count be excluded from the cycle when a further image is selected by a user for display.

For larger groups with multiple terminals one or more display terminals may be appointed as moderators in which case images selected for communal display may first be transmitted to the moderator terminal prior to display on a communal basis.

BRIEF DESCRIPTION OF THE DRAWINGS

A display system in accordance with an exemplary embodiment of the invention will now be described by way of example only with reference to the accompanying drawings of which.

DETAILED DESCRIPTION OF EXEMPLARY EMBODIMENTS

Figure 1:
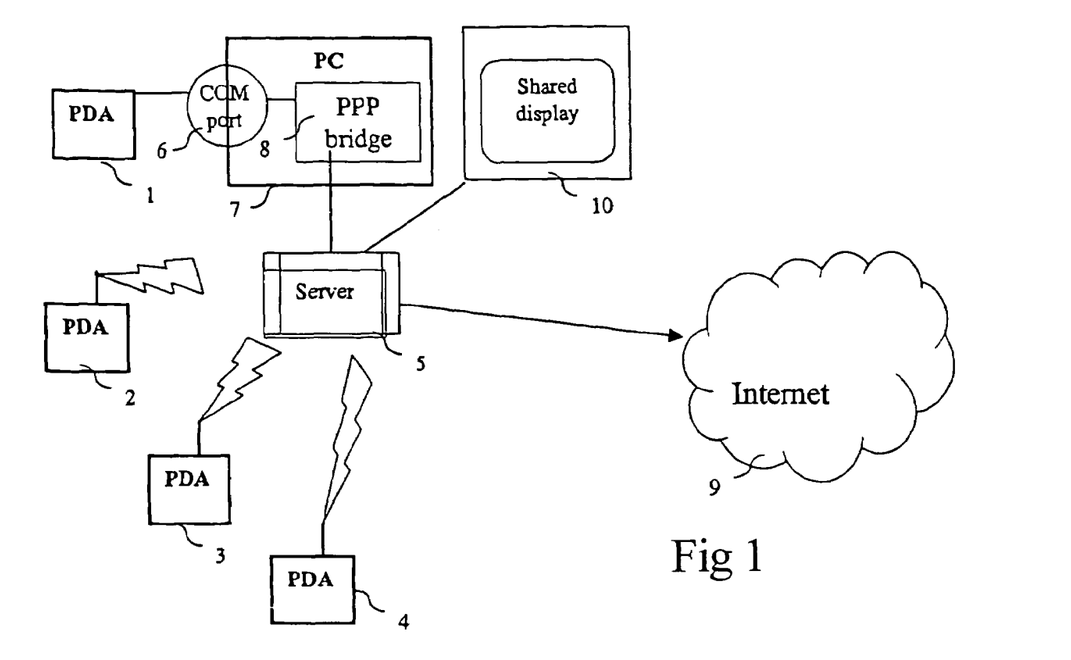
FIG. 1 is a block schematic diagram of the system.

Referring first to FIG. 1, the system to be implemented comprises a number of personal browsers 1,2,3,4 each in communication with a server system 5. The personal viewing terminals each comprise a viewing screen and control means for selecting, by way of browser software (for example Microsoft Internet Explorer or Netscape Navigator) pages of information for display at the terminal.

The server system 5 may include a data store having pages selectable by the viewing terminals 1–4 but will more likely operate as an interface through which communication with other data networks such as the Internet (World Wide Web) or an intra net is possible.

The viewing terminal 1 comprising a display screen and a keyboard connected by way of a communications port 6 to a personal computer 7 is a typical domestic type arrangement except that the PC 7 is connected by way of a bridge 8 to the proxy server 5.

The viewing terminal 2 is a typical personal digital assistant using low power radio communication such as "Bluetooth" to maintain two way linkage to the proxy server 5 while similarly configured viewing terminal 3 uses other wireless LAN technology or infra red terminal communication. Viewing Terminal 4 may comprise a cellular type telephone terminal using a virtual private LAN through for example 3G cellular communication.

Figure 5A:
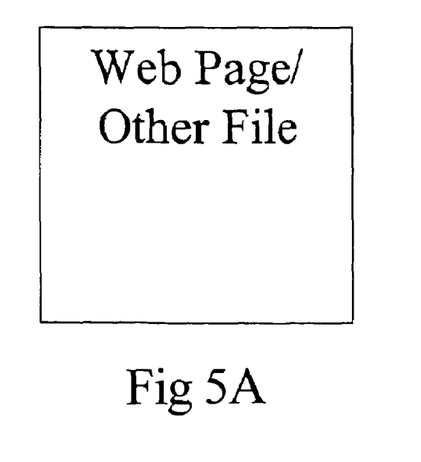
FIG. 5A is a schematic representation of a screen display as received.
Figure 5B:
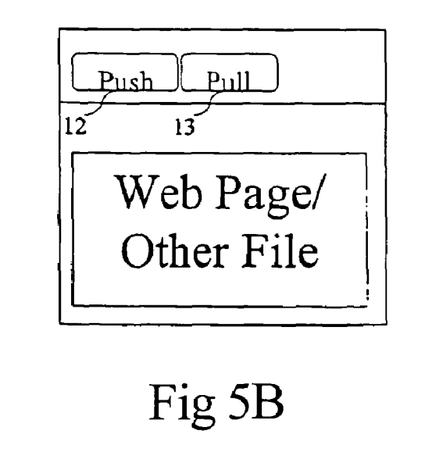
FIG. 5B is a schematic representation of a screen display as modified by the proxy server of FIG. 1 for display on a PDA.
Figure 5C:
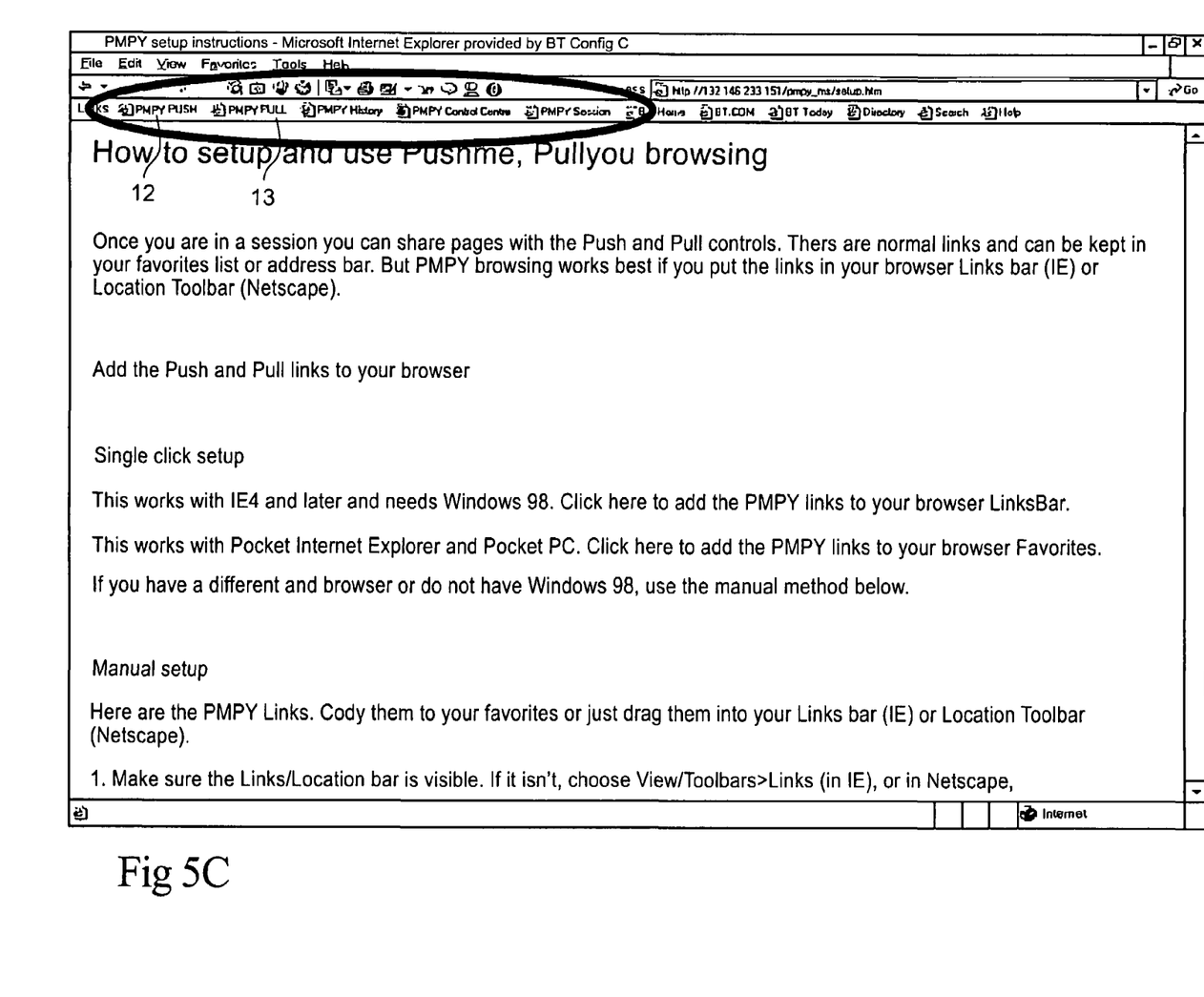
FIG. 5C is a reproduction of an actual window display corresponding to the schematic of FIG. 5B.

Now, whenever one of the viewing terminals requests a page of information from the internet 9 (for example) the proxy server 5 acts to recover that information based upon the URL submitted. The page recovered for display is noted in the server 5 and transmitted in a slightly modified form to the requesting viewing terminal, say 2. Thus referring also briefly to FIG. 5, in FIG. 5A there is shown a representation of a page of information 11 as recovered for viewing from the internet 9. FIG. 5B shows the page as displayed at the requesting viewing terminal 2 in which additional clickable buttons 12 and 13 have been added. In FIG. 5C is a representation of a page as displayed with the additional buttons shown in the toolbar towards the top left hand side of the viewing screen.

Now as shown in FIG. 1 to which reference is again made, there is included a shared display screen 10, for example a wall mounted display screen visible to the users of the viewing terminals 1–4.

Although the display screen 10 has been shown as a single, separate display screen it will be appreciated that several such screens could be available, possibly associated with individual terminals, where larger terminals are in use the shared display may be incorporated as a small overlay in the requested display.

The display screen 10 is intended to provide an opportunity for a user of one of the personal viewing stations 1–4 to offer his current view to other participants in the community (hereinafter "push mode") and/or for each viewer to be able to capture the currently displayed communal page on the shared display 10 to his own viewing terminal (hereinafter "pull mode").

Figure 2:
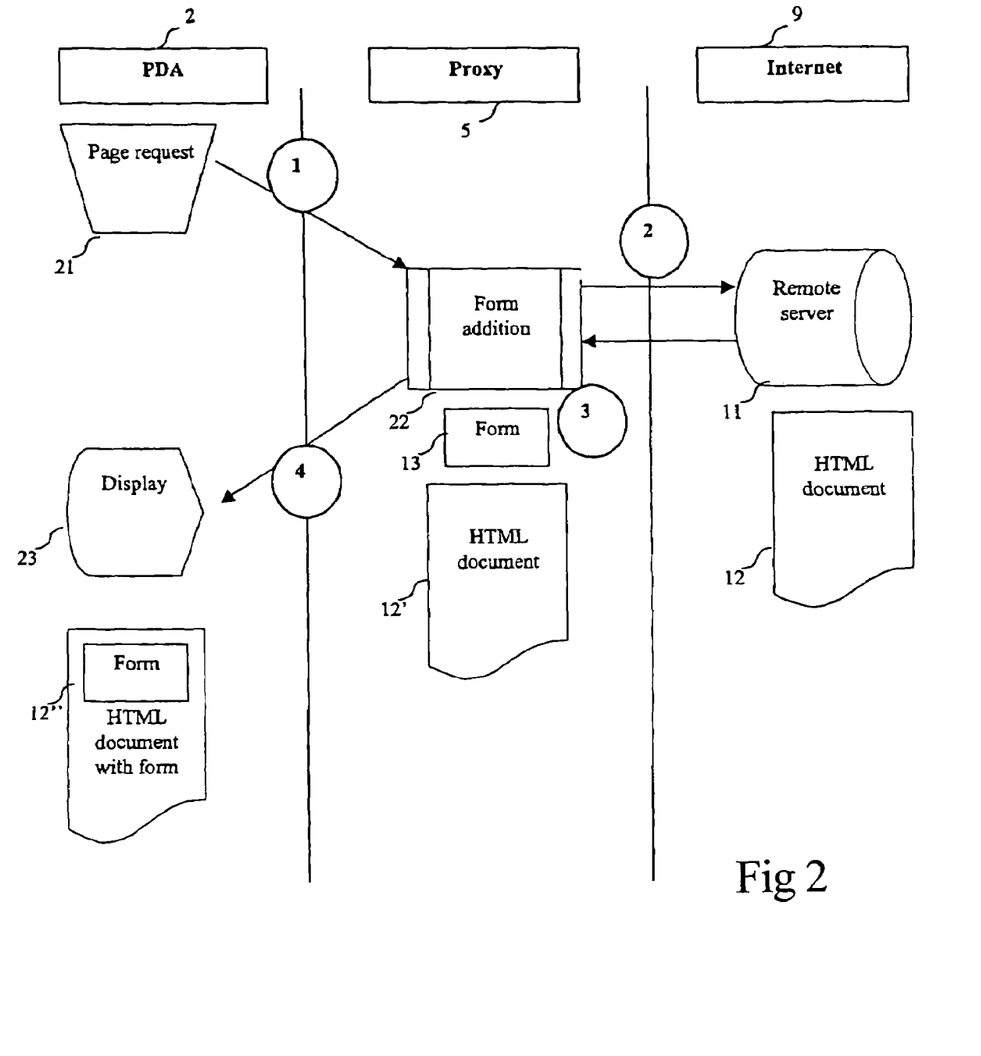
FIG. 2 is a function and signalling schematic diagram showing interactions between the proxy server of FIG. 1, one of the PDAs and the World Wide Web.

Thus turning additionally to FIG. 2, the interaction between one of the viewing terminals, say the PDA 2, the proxy server and the internet is shown. Here, in the initial step 21 the user sends a page request to the proxy server 2. This request may be by way of a typed URL or could be because the user of the terminal 2 has clicked on a link from an existing display therefore allowing the browser to automatically capture the URL from the link and to transmit data defining the URL accordingly. This is indicated in FIG. 2 by circled stage 1.

The request is handled in the proxy server 5 by using the URL to identify a remote server 11 having the requested page stored therein. The function of recovering information from the internet using addressable servers and pages therein is now well known and is not discussed in detail herein. (Circled stage 2).

The remote server 11 will transmit data defining the page to be displayed back to the proxy server 5 (stage 3) in the form of an HTML document (12). This document is received by the proxy server and the HTML document is stored in a temporary cache as document 12'. A standard form 13 is now used by a form addition function 22 to add in the additional clickable buttons for the display thus creating 12" for display on the terminal 2 display screen 23 (Stage 4).

Now considering FIGS. 1 and 3, and again assuming that the terminal 2 is the active terminal, when the user selects the push mode button on the display, a push instruction is sent to the proxy server 5. (Circled indication 1) to cause the proxy server 5 to run a shared page update function 32 which will cause the currently viewed screen at terminal 2 (as stored also in the proxy server 5) to be appropriately reformatted and transmitted to the display area 10. Thus, the proxy server 5 may attempt to update the page from the internet 9 and remote server 11 (circle step 2) and will then transmit the HTML page 1''' to the shared display screen 10. Note that this display does not have clickable links added but simply the information page to be displayed.

Figure 3:
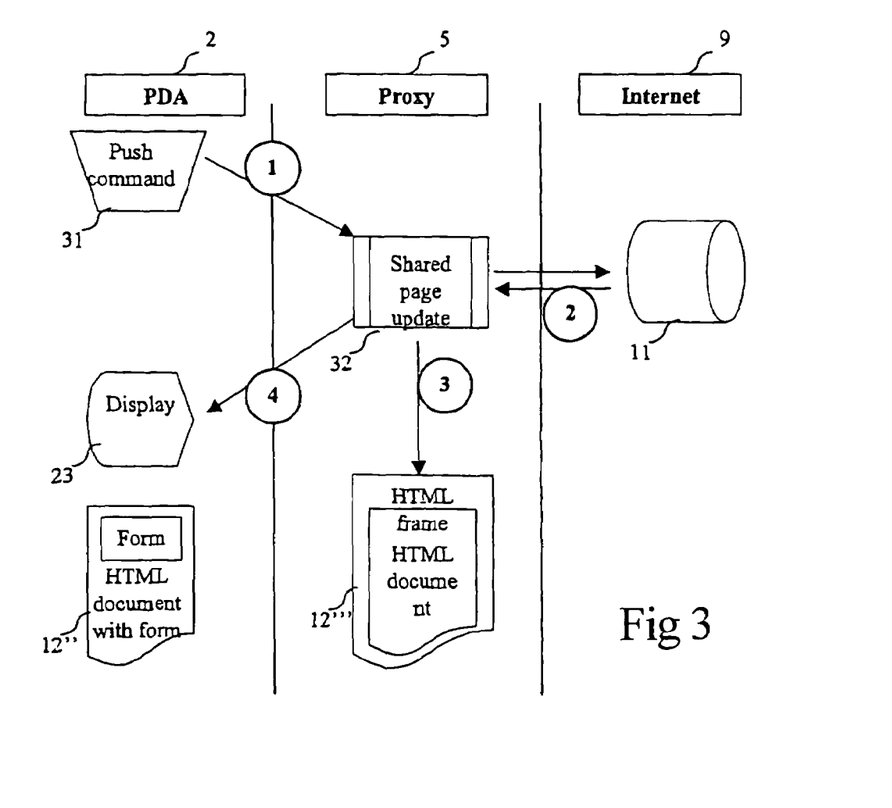
FIG. 3 is a function and signalling schematic diagram showing interactions between the proxy server of FIG. 1, one of the PDAs and the World Wide Web in a first mode of operation ("Push Mode")

Thus the user of the viewing terminal 2 having found information potentially of interest to the other viewers has pushed that information to the common viewing platform without needing to notify the others individually of the URL and without needing to interrupt the browsing by the other participants.

For the avoidance of doubt it is noted that the display screen 10 (the shared display) may be divided in to a number of segments or display areas each capable of displaying a single frame whereby multiple previous frames pushed by users may be displayed. The displayed frames may be grouped according to the pushing user or by retrieval or push sequence. Users may select a particular frame to pull by, for example, alphas numeric indication or by a personal on screen indicator, for example a stepping framework or arrow identified to the individual user by character marking or colour for example.

In a demonstration system using PDAs and a server, referred to hereinafter, the push mode is implemented as follows:

When a user presses the Push button, the form is submitted using the Get command with a textfield containing the currently viewed URL.

Figure 4:
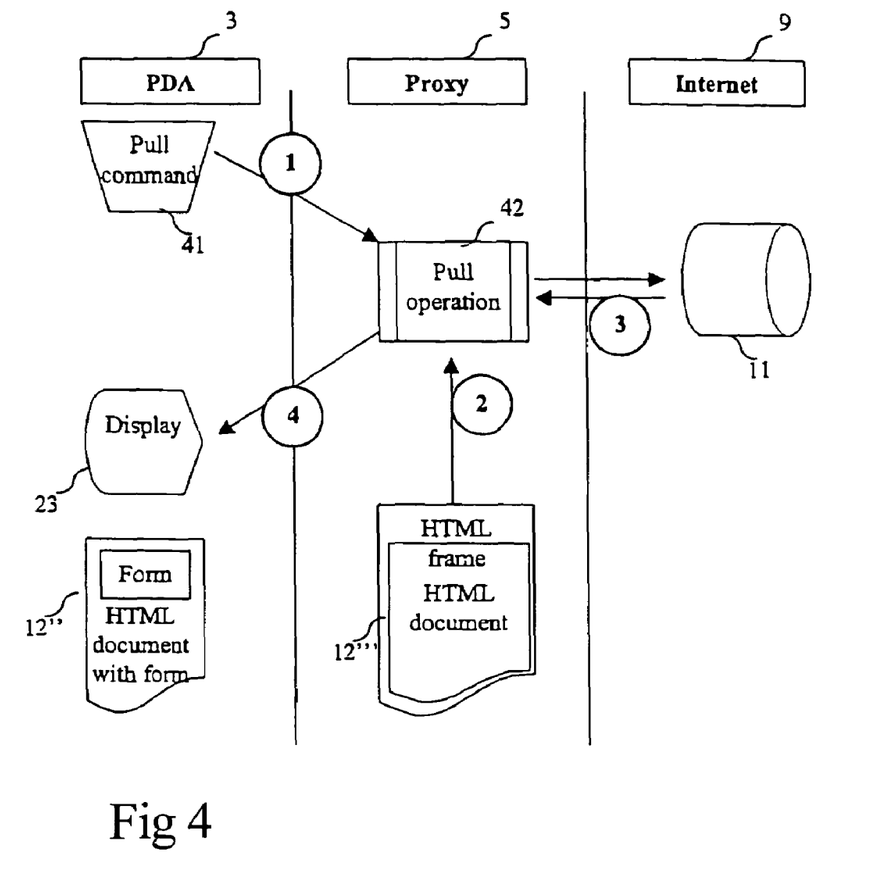
FIG. 4 is a function and signalling schematic diagram showing interactions between the proxy server of FIG. 1, one of the PDAs and the World Wide Web in a second mode of operation ("Pull Mode")

In FIG. 4 to which reference is now made, continuing also to consider FIG. 1, assume now that the user of viewing terminal 3 wishes to view the information shown on the communal display 10 then by clicking on the pull button a pull command 41 is sent to the server 5 (circle step 1) initiating a pull operation macro function 42. The pull operation recovers the HTML page 12''' as displayed on the communal display screen 10 (step 2) updates it from the remote server 11 if appropriate (step 3) and then adds the appropriate form to create the same document 12" for display on the respective display screen 23 of the viewing terminal 3. This is then transmitted (step 4) so that the user of terminal 3 has pulled the desired information to his terminal.

Again for the illustrative system, the pull command is implemented submitting the form when a user presses the Pull button. The form is again submitted using Get with a textfield. However, the textfield is ignored by the proxy pull command. The proxy returns to the device the shared webpage URL.

In this illustrative system, the shared display 10 is a browser viewing a webpage. This webpage has 2 frames. The top frame is invisible (hidden) and contains a Java applet that controls the contents of the second, visible, frame. When the shared web page is changed by a push command from a connected device, the applet loads into the second frame that particular URL and records the URL in the hidden frame for reference.

IBM's Java based WBI system was used to build the proxy. Other proxy server technologies and software could have been used. The proxy receives page requests from connected devices and retrieves the web pages, adding the push and pull functionality as described. The proxy also controls the shared web page. The functionality of the server relies on the following usage of the features of the WBI system:

The java class AddLinks handles 3 actions—the first two happen to the HTTP response arriving from the website and add the form to webpages sent to devices, the third affects the response to the HTTP request received from a browser.

URLFinder reads the incoming HTTP header and finds the page's URL.

AddButtonEditor inserts the URL from URLFinder into a hidden textfield and puts Push and Pull buttons in a HTML form at the top of the page.

PageRequestEditor reads the request coming from a browser on a connected personal device and if the URL does not contain a keyword then the request gets treated as a normal HTTP request and retrieves the web page. If the keyword indicates that the request is a pull request, the HTTP request URL gets replaced by the shared URL and the proxy completes the HTTP request by retrieving the shared web page. If the keyword indicates a push request, the shared URL is set to the URL in the form's hidden textfield, and the proxy then returns the same page (the process is similar to processing a 'pull' once the shared URL is set to the user's current URL). A push also calls the sendUrl( ) method which waits for a browser to connect to port 8768. When a browser connects it sends the current shared URL to the port. This is for the shared display.

A further class, PushedUrlViewer is the applet that runs in the shared webpage shown on the shared display. It tries to connect to port 8768 every second, and if it manages to connect then it loads the URL it receives into the visible frame, called 'mainShare', in the shared browser.

The exemplary embodiment of the invention described here is a configuration of technology that is designed to match the way a group of people browse information in real time as a group. Further to simple pushing and pulling to and from a shared display, the design can be evolved to include more functionality, for example:

The inclusion of the currently shared URL as a text string on the personal device which is visible near the Push and Pull buttons.

The proxy could preferably use a cache that stores the currently shared page or file thereby removing the need to retrieve a resource which has already been received. This would improve the time taken to send information to personal devices. A store could also record the group session for review afterwards.

A history of previously shared pages, allowing users to jump to previous entries as well as the current entry. This also serves as a record of the material found. This can be included on the personal device and on the shared display.

The history may also be held in file storage at the server 5 so that users may review the retrieved pages off-line possibly by resetting to the very first "pushed" page & stepping through pushed pages, This allows informed browsing based on pages selected for viewing by a user group.

Time control of shared entries: if many requests are received close together, each entry appears for viewing on the shared display for a reasonable amount of time. There is therefore a 'stack' or 'queue' of entries which is visible on the shared display and/or the personal device.

The ability to push and pull content and files irrelevant of the type and without a URL—i.e. pushing the file itself to the shared resource or pulling a file from the shared display.

The ability for users to control the shared display from their personal devices: e.g. to scroll information.

The ability of the browser to adapt the content it sends to devices depending on their capabilities. This adaptation applies to both the way the extra functionality is added to the content requested by the device and also the adaptation of content itself if the information host does not have such abilities (e.g. smaller pictures and different layout methods for smaller devices, or WML presentation for mobile phones). The demonstration system relies on the browser compatibility with the content.

The invention is not restricted to the exemplary software design used to demonstrate the concept. Particularly:

The method of using a "form submit" to transmit Push and Pull requests is used for convenience only and entails re-loading pages upon a Push action which is not intended necessarily to be part of an ideal design.

The Push and Pull buttons (and further functionality implied by the design and described above) are displayed using a form section at the head of the page for simplicity on small devices with low functionality browsers. Other methods will be possible, for example using frames for this presentation, which may be possible on some devices, or adding buttons or menu items to the browser itself.

Further to the build described here, the system allows further configurations of a multiple user communal browsing application:

The push event and pull event need not use a URL of a file, but could instead Push and Pull the actual file to and from a personal device. In this way this technique can be adapted to allow users to share resources other than internet pages.

The Proxy function could also be built using a client application on a device. Users would initialise a communal session by establishing a session with users connected through any network and the shared display similarly would connect to the shared webpage.

The network connection used by devices is irrelevant to the invention; connections could be made using wireless local area network connections (WLAN), Bluetooth connection, modem dial-up or any other technology or protocol. The demonstration system does not transcode content for different connections but this is an apparent enabling utility which has known implementation.

The Proxy function could also be built using a distributed application (such as a java applet) within a remote or local website—i.e. without using a proxy server. Users would initialise a communal session by visiting the website which then runs the applet on each client (including the users and a shared display) and the session would be handled using the distributed application. Push and pull events would send commands to a central server which stores information and responds to commands—but this central server would not be acting as a proxy. The applets would know the session ID and retrieve and set the shared information source. Applets would also dynamically update information such as the text expression of the currently shared resource and the history and queue of files. This configuration of software represents the same novel interaction that this invention describes but achieves the result in a different way.

Further to the distributed application described in the previous paragraph, the application could also utilise small software applets or functions which set-up the session to act through a proxy or as a distributed application with the correct settings.

In addition to other applets described, a client-side applet could be used to control the shared display—namely to scroll the display or control other display attributes such as zoom or selection.

Referring now to FIG. 6, typical user interaction results in display changes reflecting the users actions such as is now described.

Figure 6A:
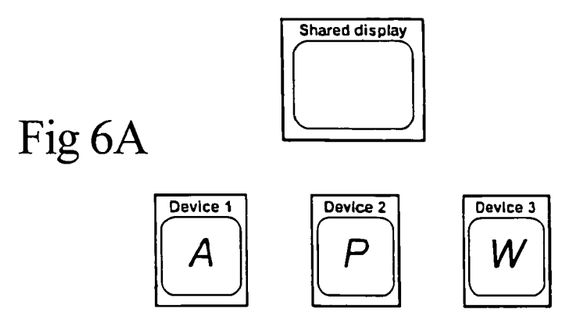
FIGS. 6 and 7 are information flow diagrams representing different examples of interaction between the terminals of FIG. 1.

If three viewers are in use with respective display screens as may be seen from FIG. 6A each is viewing a different screen of information—respectively A, P, W. At this stage there is no shared display.

Figure 6B:
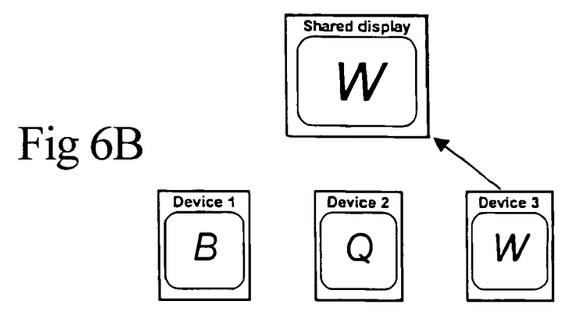

As shown in FIG. 6B if the user of device 3 seeks to share information using the push button the shared display receives page W as being displayed at the respective screen. The other browsers have moved on respectively to view pages B, Q.

Figure 6C:
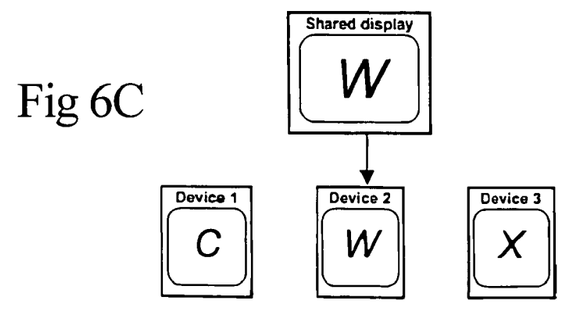

In FIG. 6C the user of device 2 uses the pull function to bring page W to his own display while the other two users move on respectively to view pages C, X.

Figure 6D:
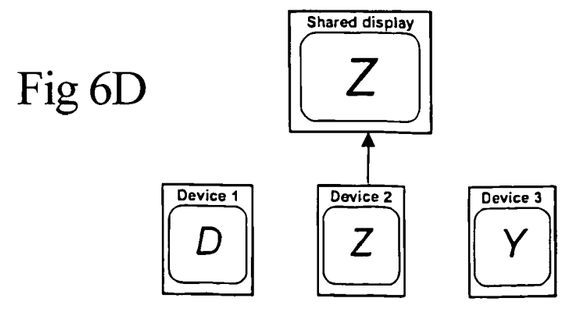

In FIG. 6D each of the browsers has moved onto view pages D, Z, Y respectively and the user of device 2 having found page Z has pushed Z to the communal display.

In FIG. 7 the same sequence is shown as for FIG. 6 but with the user of device 3 acting as a moderator giving permissions to control the communal display. Thus as before in FIG. 7 A, three personal devices are connected to the communal browser and each is viewing a different web page, respectively B, Q, W with the user of device 3 having pushed the frame W to the communal display.

Figure 7A:
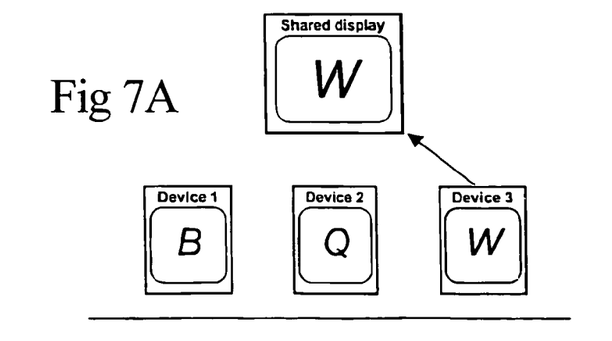
Figure 7B:
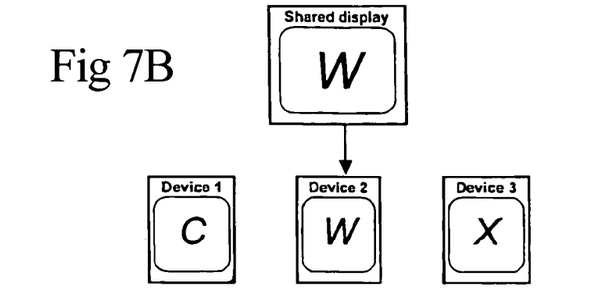
Figure 7C:
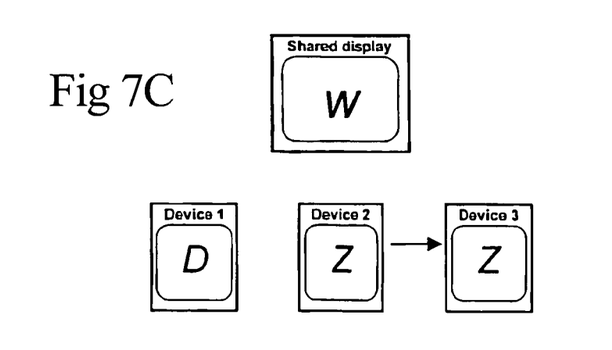
Figure 7D:
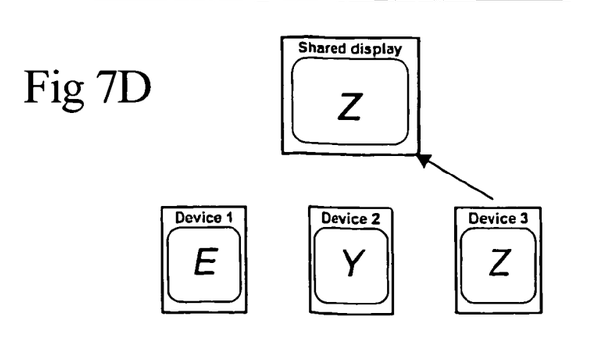

In FIG. 7B the user of device 2 pulls the frame W to his own display and in FIG. 7C moves on to find page Z. Here when the user of device 2 uses the push function, screen Z is not directly sent to the communal display but is sent instead to the moderator by the server and only when the moderator pushes the display does it go to the communal display as shown in FIG. 7D. This allows control of the communal display for example in a family situation where inappropriate images can be avoided.

Another practical embodiment of the display system is now to be described with reference to the remaining figures of the drawings.

The PushMe-PullYou (PMPY) browser is a service that allows a group of people to interact with a common display, allowing for example, collective browsing. The interaction is via personal handheld devices that allow web browsing, such as PDAs or 3G mobile phones. This technology is applicable to both business and personal use.

The user interface has the PMPY functions within the Link Bar or the Browser. These links bars have been available in Microsoft, Internet Explorer and Netscape for a few years. When the browser does not have a Links Bar, for example as is the case currently in Microsoft Pocket Internet Explorer these PMPY functions are placed in the Favourites of the browser.

The following functions (links) are added to the Browser Link Bar
PMPY Push (pushes an URL)
PMPY Pull (pulls an URL)
PMPY History (shows history list)
PMPY Control Centre (choose session, create session)
PMPY Session (join session, leave session, shared display)

As the result the browser looks as shown in FIG. 5C A modern Client/Server concept is used to implement the PMPY application. As in every web environment the client is just a web browser. This web browser displays the HTML script that it receives from the server, i.e. the web server. Practically all of the code required runs at the server. Only a few lines of code (JavaScript) are needed at the client. The PMPY functions and the storage run at the server.

An explanation of a general design is described first.

Figure 8:
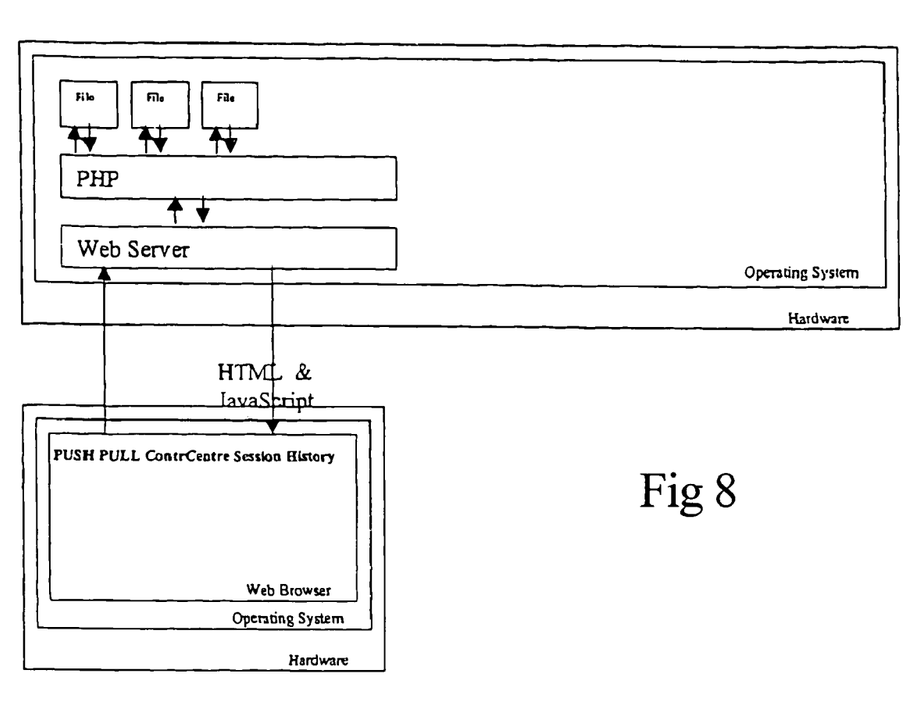
FIG. 8 shows an architecture diagram of a possible implementation.
Figure 9:
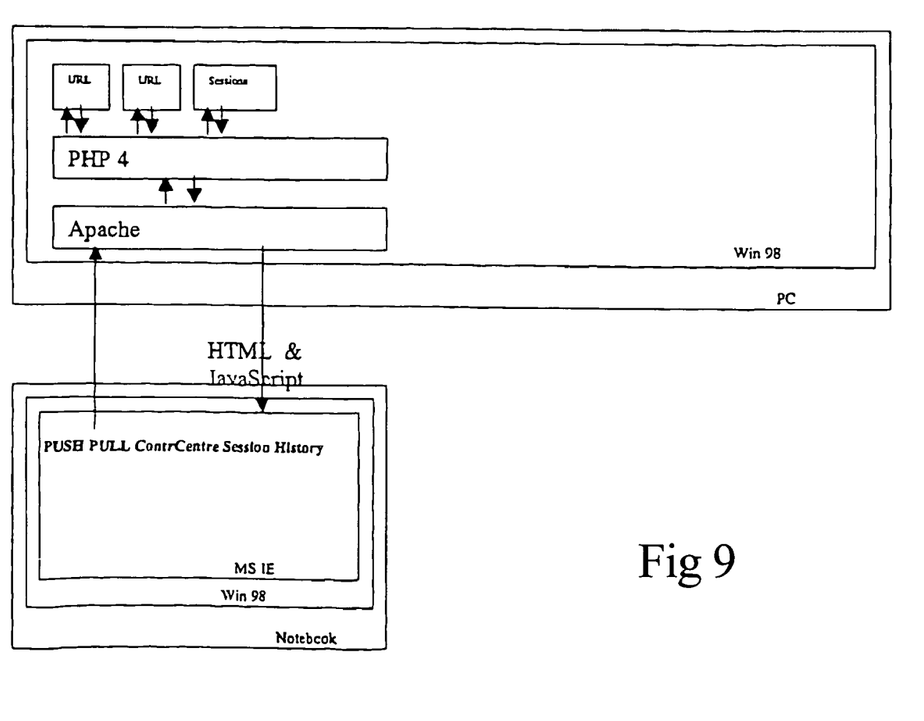
FIG. 9 shows a preferred architecture.

Server
the appropriate hardware is chosen corresponding to the operating system
Any operating system can be used on which a Web Server and PHP can run (Win98, Win2000, WinXP, WinNT, AIX, Solaris, Linux)
Any Web Server which is PHP enabled can be used
All data is stored in files but could be stored in a database.
PHP was chosen as the programming language. However, any suitable language may be used including for example Perl Client
Any hardware where a web browser is available
Any operating system where a web browser is available
Web Browser (JAVASCRIPT enabled)
The architecture shown in FIG. 8 is used and works as follows:

User driven
User calls an PMPY function (PUSH, . . . ) by clicking on the appropriate link
This link makes a request to the web server.
The web server opens and analyses the corresponding file (HTML or PHP format).
The web server extracts the code it does not understand (PHP code).
There are two ways how the web server and PHP are corresponding
The web server is loading the PHP interpreter as a module and interprets the PHP code itself. or
The web server calls the PHP program (CGI-mode). The PHP program returns the result (HTML code) to the web server.
The web server sends the HTML code to the requesting browser
The web browser interprets the HTML code and displays it. There are also a few lines of JAVASCRIPT necessary which the web browser has to interpret.
A preferred architecture is shown in FIG. 9 to which we now refer.

Server
Hardware: PC
Operating System: Win98
Web Server: Apache
PHP: PHP4
Storage: Files Client 1
Hardware: notebook
Operating System: Win98
Web Browser: Microsoft Internet Explorer 5, Microsoft Internet Explorer 5.5

Client 2
Hardware: Compaq iPAQ
Operating System: Pocket PC
Web Browser: Microsoft Pocket Internet Explorer Many different clients are possible and the following have been tested and shown to support the required functionality Microsoft Internet Explorer 5, Microsoft Internet Explorer 5.5 and Microsoft Pocket Internet Explorer. The web browser must be able to interpret JAVASCRIPT.

Figure 10:
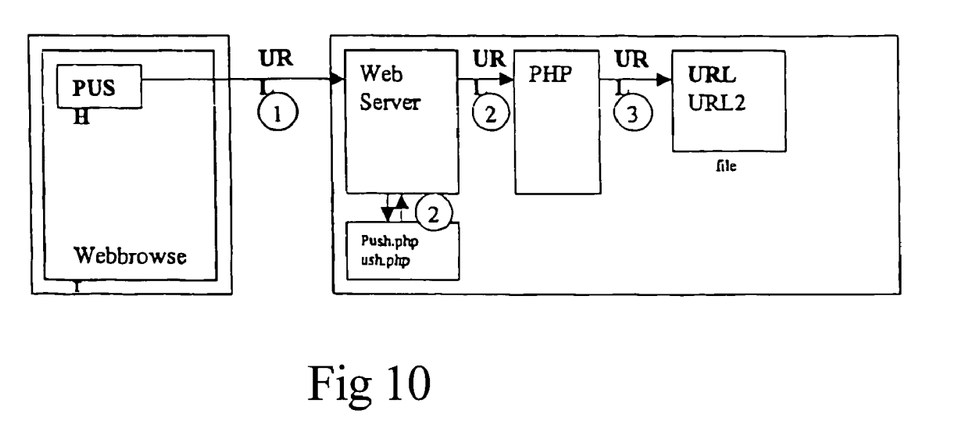
FIGS. 10 to 12 are step diagrams for the architecture of FIG. 9.

Referring now to FIG. 10, The following steps happen when a user uses PMPY PUSH.

The link calls the web server and provides the current URL. (1)

The web server opens the push.php file and gives the php code to the PHP interpreter. (2)

The PHP interpreter looks in which session the user currently is and stores the URL to the appropriate file. (3) There is one URL file for every session. If the user has not joined a session yet he will be asked to join one.

Figure 11:
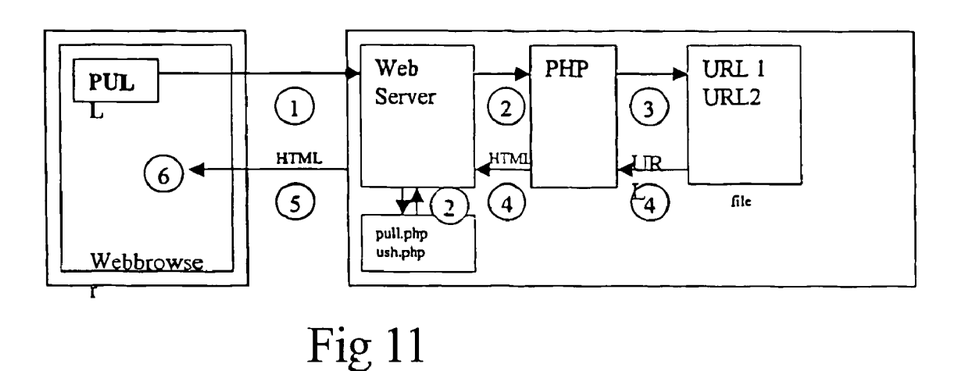

The pull function is now described with reference to FIG. 11.

The link calls the web server. (1)

The web server opens the pull.php file and gives the php code to the PHP interpreter. (2)

The PHP interpreter looks in which session the user currently is and opens the appropriate file. (3) If the user has not joined a session yet he will be asked to join one.

The PHP program reads the latest URL from the file and creates and HTML file where this URL is put into a frame. (4) (This ensures that the content is shown within this page and that the BACK button works properly.)

The web server sends the HTML page to the web browser. (5)

The web browser reads the page and displays the contents of the URL. (6)

Figure 12:
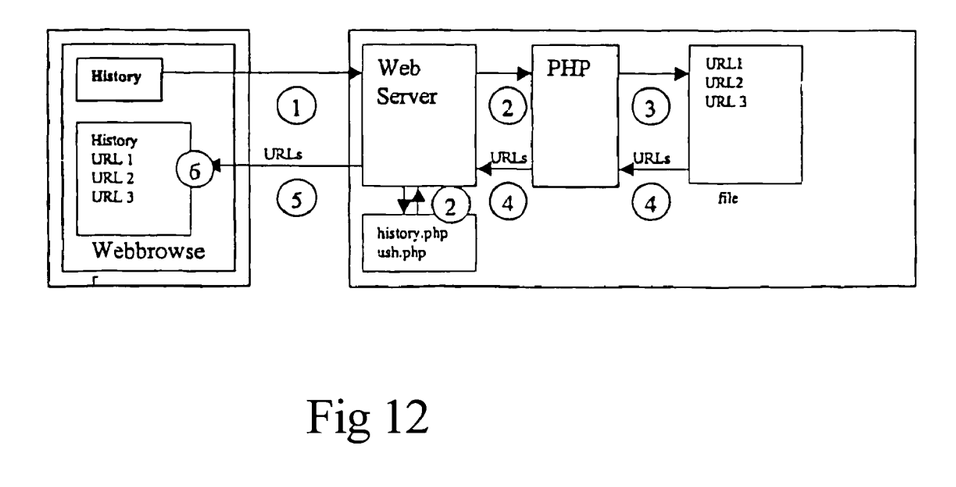

Now referring to FIG. 12, if the history button is used then the PMPY HISTORY link calls the web server. (1)

The web server opens the history.php file and gives the php code to the PHP interpreter. (2)

The PHP interpreter looks in which session the user currently is and opens the appropriate file. (3) If the user has not joined a session yet he will be asked to join one.

The PHP program reads all URL from the file and creates and HTML file where this URLs are listed. (4)

The web server sends the HTML page to the web browser. (5)

The web browser reads the page and displays the list of URLs. (6)

The shared display shows all users what is going on within a session. Now referring to FIG. 13, the following steps happen if a user sets up a shared display. The user goes to the Session Screen and gets the SHARED DISPLAY link for this session.

Figure 13:
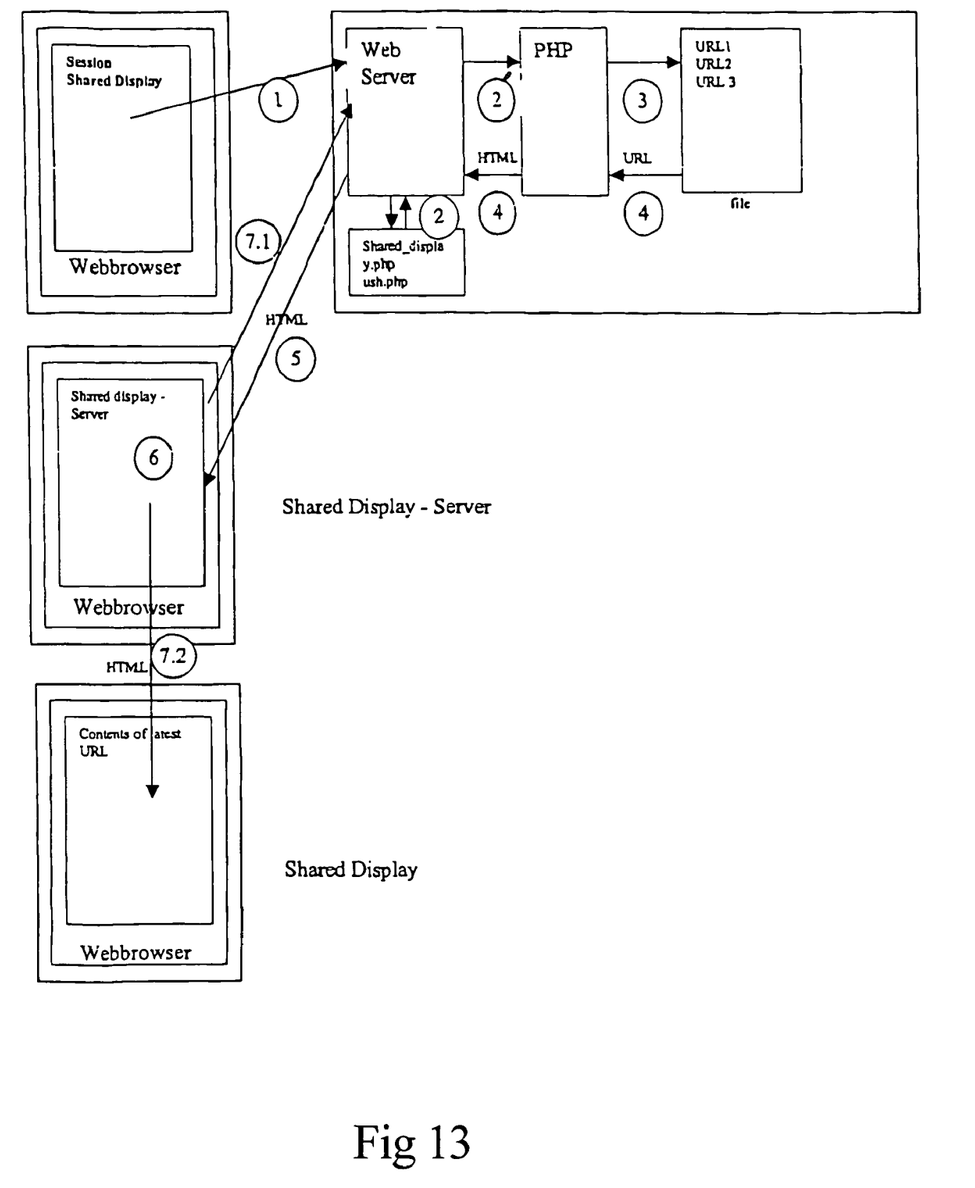
FIG. 13 is a session management schematic for the architecture of FIG. 9.

The SHARED DISPLAY link calls the web server. (1)

The web server opens the shared-display.php file and gives the php code to the PHP interpreter. (2)

The PHP interpreter looks in which session the user currently is and opens the appropriate file. (3) If the user has not joined a session yet he will be asked to join one.

The PHP program reads the latest URL from the file and creates an HTML file. (4)

The web server sends the HTML file to the web browser. (5)

The web browser reads the page and interprets the nested JAVASCRIPT code. (6)

The JAVASCRIPT code contains two functions

It asks the web server every five second if there was another URL pushed in this session. In fact it sends the request (1) again. (7.1)

It opens another web browser. Finally this new web browser is the proper shared display and shows the content of the latest pushed URL. (7.2)

This implementation of PMPY can support multiple sessions. The user can create and choose a session in the Control Centre. The PMPY SESSION screen is used to JOIN and LEAVE a session. Furthermore the PMPY HISTORY and the SHARED DISPLAY can be called at this screen.

When a user creates a new session the session name and session information are stored in the session.txt file A session URL file is created (history_XXX.txt). This file will contain the URLs.

When a user joins a session the file user.txt will be updated with the user information and the session information.

When a user leaves a session the current user will be removed from the file user.txt.

The User then can explore the Internet as usual. If he finds an interesting page he can push it. If he wants a page from the others he can pull it. But there is throughout a normal browsing feeling.

What is claimed is:

1. A display system comprising:
   at least two independent workstations and an interface server for connection to a data network,
   the server including means responsive to input from each of plural workstations to recover requested data and to transmit said data only to the requesting workstation,
   the server further including means responsive to a first kind of input instruction from one of the workstations to cause the current display on that workstation to be replicated for communal display and means responsive to a second kind of input from one of the workstations to cause the current communal display to be replicated on that workstation.

2. A display system as in claim 1 in which the communal display is a communal display screen and at least one of the workstations comprises a personal display screen and input means.

3. A display system as in claim 1 in which at least one workstation is a personal digital assistant including internet browser software, the software being adapted to communicate by way of the server.

4. A display system as in claim 1 in which the server recovers requested information from the connected data network for each connected workstation and adapts the respective displays for each workstation to include "push" and "pull" icons which may be user selected using cursor or pointer selection as appropriate to the workstation.

5. A display system as in claim 1 in which at least some of the workstations comprise browser pads or terminals having larger display screens whereby the server is adapted to incorporate the communal display in a portion of each display screen for potential selection by the other users.

6. A display system as in claim 1 in which the communal display incorporates several areas each capable of displaying a communal image so that a plurality of images pushed by users may be presented.

7. A display system as in claim 1 in which the server resolves conflict between arriving push requests by displaying a first image for a predetermined minimum period followed by a further image selected by a different user.

8. A display system as in claim 1 in which the server causes images selected by users to be cyclically displayed on the communal display.

9. A display system as in claim 8 in which each image is displayed until-a cancellation by the originating requester.

10. A display system comprising:
at least two independent workstations and an interface server for connection to a data network,
the server including means responsive to input from each of the plural workstations to recover requested data and to transmit said data to the requesting station,
the server further including means responsive to a first kind of input instruction from one of the workstations to cause the current display on that workstation to be replicated for communal display and means responsive to a second kind of input from one of the workstations to cause the current communal display to be replicated on that workstation
wherein the server causes images selected by users to be cyclically displayed on the communal display screen;
wherein each image is displayed until cancellation by the originating requester; and
wherein when the originating requester of an image for the communal display selects a new image for display, any previous image selected by the same user is removed from the cycle.

11. A display system as claimed in claim 8 in which the server is arranged to limit the number of images in the cycle to less than the number of users.

12. A display system comprising:
at least two independent workstations and an interface server for connection to a data network,
the server including means responsive to input from each of the plural workstations to recover requested data and to transmit said data to the requesting station,
the server further including means responsive to a first kind of input instruction from one of the workstations to cause the current display on that workstation to be replicated for communal display and means responsive to a second kind of input from one of the workstations to cause the current communal display to be replicated on that workstation
wherein the server causes images selected by users to be cyclically displayed on the communal display screen;
wherein the server on receipt of a further request to push an image to a communal display when a predetermined maximum number of images are already in the cycle deletes either the least accessed or oldest image from the cycle.

13. A display system as in claim 12 in which the least accessed image is not deleted until it has been in the display cycle for a predetermined minimum period.

14. A display system as in claim 12 in which the least accessed image is determined by use of then an access/time leaky bucket counter such that each pull access to the image causes a count to be incremented, the count being decremented at periodic intervals, and the image having the lowest count being excluded from the cycle when a further image is selected by a user for display.

15. A display system as in claim 1 in which at least one of the display terminals is appointed as a moderator, the server causing images selected for communal display to be transmitted to the moderator terminal prior to display on a communal basis.

16. A display system as in claim 1 in which the server is responsive to a request from a display terminals to provide a listing of all pushed images during a defined period whereby the user may push or pull a previously viewed image.

17. A display system as in claim 1 including a data store which stores an history of a communal browsing session, the server being responsive to individual user requests to display pushed pages from the communal browsing session after such a session has terminated.

18. A method for controlling a communal display including at least two independent workstations and an interface server for connection to a data network, said method comprising:
responsive to input from each of the workstations, recovering requested data and transmitting said data only to the requesting workstation,
responsive to a first kind of input instruction from one of the workstations, causing the current display on that workstation to be replicated for communal display; and
responsive to a second kind of input from one of the workstations, causing the current communal display to be replicated on that workstation.

19. A method as in claim 18 wherein the communal display is a communal display screen and at least one of the workstations comprises a personal display screen and input means.

20. A method as in claim 18 wherein at least one workstation is a personal digital assistant including internet browser software, the software being adapted to communicate by way of the server.

21. A method as in claim 18 wherein the server recovers requested information from the connected data network for each connected workstation and adapts the respective displays for each workstation to include "push" and "pull" icons which may be user selected using cursor or pointer selection as appropriate to the workstation.

22. A method as in claim 18 wherein at least some of the workstations comprise browser pads or terminals having larger display screens and the server is adapted to incorporate the communal display in a portion of each display screen for potential selection by other users.

23. A method as in claim 18 wherein the communal display incorporates several areas each capable of displaying a communal image so that a plurality of images pushed by users may be presented.

24. A method as in claim 18 wherein the server resolves conflict between arriving push requests by displaying a first image for a predetermined minimum period followed by a further image selected by a different user.

25. A method as in claim 18 wherein the server causes images selected by users to be cyclically displayed on the communal display.

26. A method as in claim 25 wherein each image is displayed until a cancellation by the originating requester.

27. A method as in claim 26 wherein, when the originating requester of an image for the communal display selects a new image for display any previous image selected by the same user is removed from the cycle.

28. A method as in claim 25 wherein the server is arranged to limit the number of images in the cycle to less than the number of users.

29. A method as in claim 28 wherein the server, on receipt of a further request to push an image to a communal display when a predetermined maximum number of images are already in the cycle, deletes either the least accessed or oldest image from the cycle.

30. A method as in claim 29 wherein the least accessed image is not deleted until it has been in the display cycle for a predetermined minimum period.

31. A method as in claim 29 wherein the least accessed image is determined by use of an access/time leaky bucket counter such that each pull access to the image causes a count to be incremented, the count being decremented at periodic intervals, and the image having the lowest count being excluded from the cycle when a further image is selected by a user for display.

32. A method as in claim 18 wherein at least one of the display terminals is appointed as a moderator, the server causing images selected for communal display to be transmitted to the moderator terminal prior to display on a communal basis.

33. A method as in claim 18 wherein the server is responsive to a request from a display terminal to provide a listing of all pushed images during a defined period whereby the user may push or pull a previously viewed image.

34. A method as in claim 18 wherein a data store stores a history of a communal browsing session, the server being responsive to individual user requests to display pushed pages from the communal browsing session after such a session has terminated.

* * * * *